United States Patent [19]

Deshaw

[11] 4,268,122
[45] May 19, 1981

[54] OUTSIDE REAR VIEW MIRROR

[75] Inventor: Walter R. Deshaw, Sparta, Mich.

[73] Assignee: Keeler Brass Company, Grand Rapids, Mich.

[21] Appl. No.: 50,703

[22] Filed: Jun. 21, 1979

[51] Int. Cl.³ .......................... B60R 1/06; G02B 5/08
[52] U.S. Cl. ............................... 350/307; 248/475 B; 248/483
[58] Field of Search ............................ 350/288, 307; 248/475 B, 479, 481, 549, 483

[56] References Cited

U.S. PATENT DOCUMENTS

| | | |
|---|---|---|
| 1,558,641 | 10/1925 | Short . |
| 1,796,093 | 3/1931 | Florman . |
| 2,102,012 | 12/1937 | Hodny . |
| 2,226,482 | 12/1940 | Sarnes . |
| 2,338,780 | 1/1944 | Poncher et al. |
| 2,600,893 | 6/1952 | Mariani . |
| 2,629,286 | 2/1953 | Budreck . |
| 2,726,575 | 12/1955 | Koonter . |
| 2,938,697 | 5/1960 | Slone et al. |
| 3,434,688 | 3/1969 | Engelmann .......................... 248/483 |
| 3,471,115 | 10/1969 | Corbin ................................. 248/483 |
| 3,512,746 | 5/1970 | Vitaloni et al. ...................... 248/483 |
| 3,549,243 | 12/1970 | Horwitt et al. ................. 248/483 X |
| 3,638,899 | 2/1972 | Bonisch et al. ...................... 248/483 |
| 3,841,769 | 10/1974 | Bowerman .......................... 248/483 |

FOREIGN PATENT DOCUMENTS

| | | |
|---|---|---|
| 2432707 | 1/1976 | Fed. Rep. of Germany ... 248/475 B |
| 2522121 | 11/1976 | Fed. Rep. of Germany ... 248/475 B |
| 2719794 | 11/1978 | Fed. Rep. of Germany ... 248/475 B |

Primary Examiner—F. L. Evans
Attorney, Agent, or Firm—Price, Heneveld, Huizenga & Cooper

[57] ABSTRACT

An outside rear view mirror assembly includes a mounting bracket and a mirror carrying member. The mirror carrying member defines a generally spherical bearing surface and the bracket defines a matingly configured concave socket. A slot is formed in the socket and a conical bore is formed in the spherical bearing surface and opens therethrough. A coil spring under tension is stretched between the bracket and the mirror carrying member. The coil spring attaches at one end at the center of curvature of the spherical bearing surface. The mirror carrying member also defines a slot intersecting the bore. The mirror carrying member may pivot to a low profile position generally parallel to the sides of the vehicle.

20 Claims, 9 Drawing Figures

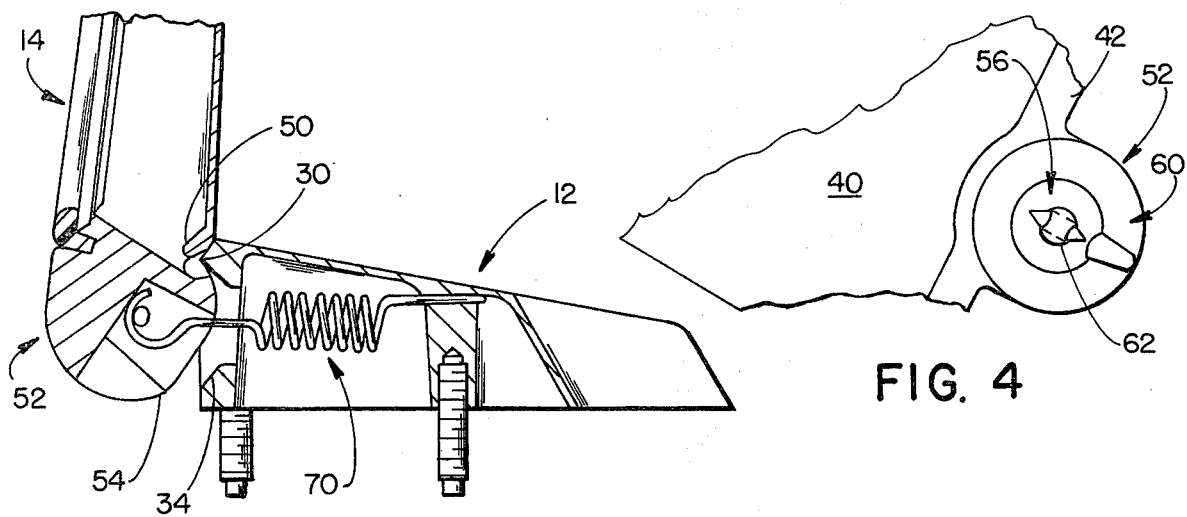
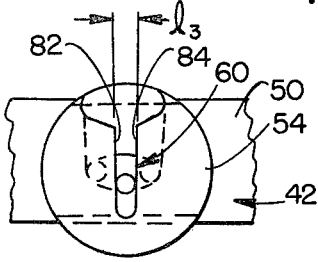
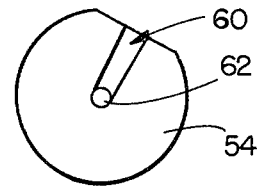
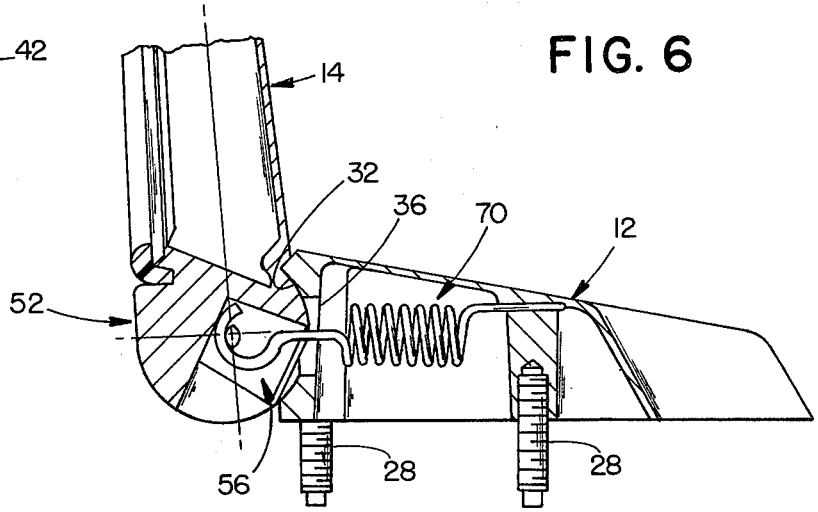
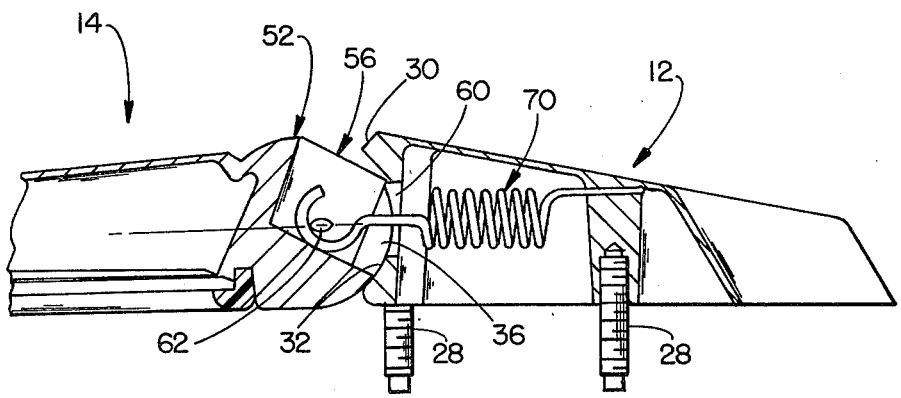

OUTSIDE REAR VIEW MIRROR

BACKGROUND OF THE INVENTION

The present invention relates to rear view mirrors and more particularly to an outside rear view mirror adapted to be mounted on the side of a vehicle.

Outside or side rear view mirrors have taken a wide variety of forms. Typically, these mirrors are mounted at the side of a vehicle and include a bracket and a mirror support structure. The bracket is physically secured to the vehicle side. Adjustment of the mirror relative to the bracket and the vehicle is accomplished by a joint structure. Typically, the joint is located at the intersection of the mirror axes. Examples of prior manually adjustable outside mirrors may be found in U.S. Pat. No. 2,726,575, entitled REAR VIEW MIRRORS FOR MOTOR VEHICLES and issued on Dec. 13, 1955, to Koonter and U.S. Pat. No. 3,434,688, entitled ADJUSTABLE SIDE VIEW MIRROR and issued on Mar. 25, 1969, to Engelmann. The Koonter patent discloses a rear view mirror including a bracket attachable to the vehicle and which defines an outwardly extending stalk portion. A mirror is adjustably secured to the stalk by a ball and socket type joint. The portion of the bracket defining the socket of the joint includes a projection extending from its center and through a spherical portion defining the ball. The joint is held in engagement by a spring under compression which pushes the components together.

Mirrors of the aforementioned general type present certain drawbacks in that they extend outwardly beyond the side of the vehicle and the stalk portion of the bracket is rigid. The potential exists for damage to the mirror structure or injury to pedestrians if such are struck by the mirror. In an attempt to alleviate these problems, various forms of so called breakaway mirrors have been proposed. One general type of breakaway mirror includes a bracket which is pivotally secured to the side of the vehicle and extends outwardly therefrom. A mirror is then pivoted to the bracket for adjustment purposes. If a force is exerted on the mirror or on the bracket, the bracket will pivot to a position generally parallel with the side of the vehicle. Such mirrors employ multiple joint structures.

An example of a breakaway mirror structure which does not, however, employ multiple joint structures may be found in U.S. Pat. No. 3,638,899, entitled OUTSIDE MIRROR FOR VEHICLES and issued on Feb. 1, 1972, to Bonisch et al. The mirror disclosed therein includes a bracket having a short stalk extending therefrom and which is attached to the vehicle side. A mirror case is secured to the stalk by a ball and socket type joint. The mirror case, stalk and joint are configured to permit the mirror to pivot about a vertical axis should the portion of the mirror which projects laterally beyond the outside contour of the vehicle strike a fixed object. The mounting bracket still extends from the side of the vehicle and is rigid therewith.

SUMMARY OF THE INVENTION

In accordance with the present invention, a unique rear view mirror is provided which is of the breakaway type and which essentially eliminates problems heretofore experienced with portions of the mirror assembly extending outwardly from the vehicle side. Essentially, the mirror includes a mounting bracket and a mirror carrying member or case. The bracket and mirror case define cooperating spherical and concave bearing surfaces. A spring under tension pulls the bearing surfaces into engagement. The mounting bracket, mirror case and surfaces are dimensioned and configured to permit the mirror case to pivot to a low profile position generally parallel with the side of the vehicle. The mirror in accordance with the present invention eliminates the outwardly extending and rigid stalk or arms, multiple joints, and permits ready, manual adjustment of the mirror for viewing purposes while providing a breakaway mode of operation.

BRIEF DESCRIPTION OF THE DRAWINGS

FIG. 4 is a fragmentary, plan view of a portion of the mirror case defining a spherical bearing surface;

FIG. 5 is a fragmentary, side elevational view of the mirror case;

FIG. 6 is a front elevational view of the spherical bearing surface defining portion;

FIG. 7 is a cross-sectional view showing the mirror case in an operating position;

FIG. 8 is a cross-sectional view showing the mirror case pivoted to its low profile breakaway position generally parallel to the side of a vehicle; and FIG. 9 is a cross-sectional view showing the mirror case pivoted forwardly under the resilient action of the tension spring.

DETAILED DESCRIPTION OF THE PREFERRED EMBODIMENT

Figure 2:
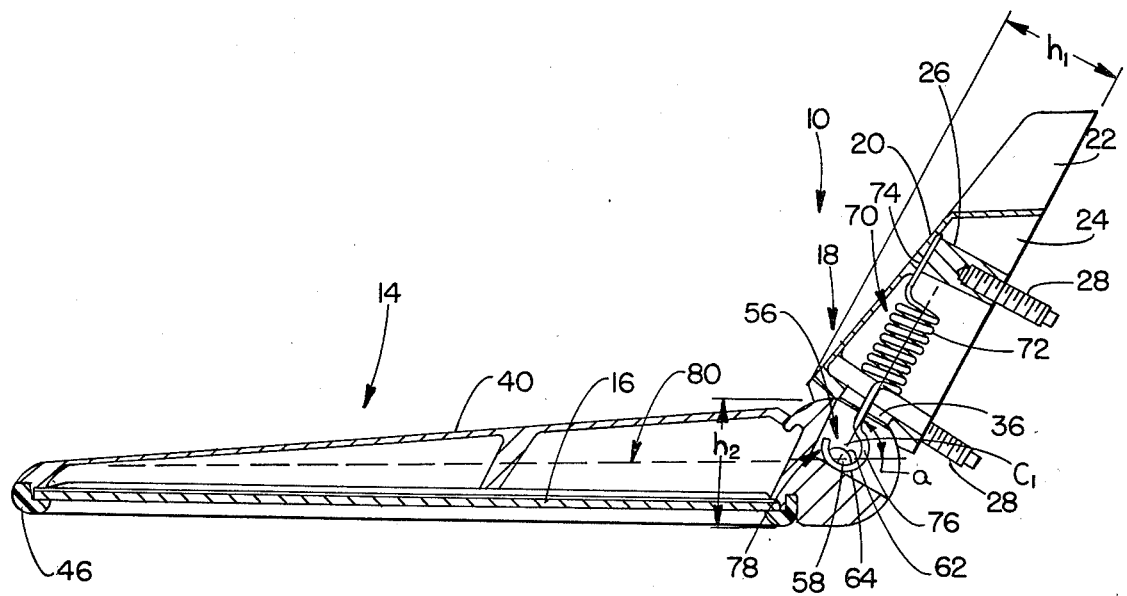
FIG. 2 is a cross-sectional view taken generally along line II—II of FIG. 1.
Figure 1:
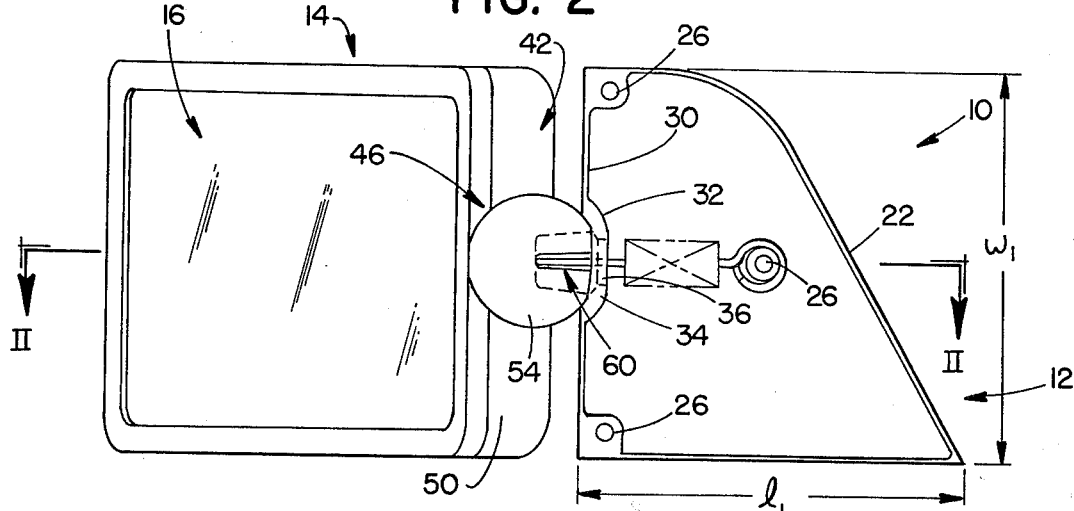
FIG. 1 is an outboard, elevational view of a rear view mirror in accordance with the present invention adapted for mounting on the left side of a vehicle.

A preferred embodiment of an adjustable, breakaway rear view mirror assembly in accordance with the present invention is illustrated in FIGS. 1 and 2 and generally designated 10. Assmebly 10 includes a bracket or housing generally designated 12 adapted for securement to the side of a vehicle and a mirror case 14 supporting a conventional mirror 16. Bracket 12 and mirror case 14 are interconnected for relative adjustment and for movement to a breakaway position by a joint structure generally designated 18.

Bracket 12 is a generally triangular shaped, low profile structure in plan and includes a generally planar outer surface 20 and a peripheral skirt or wall 22. Outer surface 20 and peripheral skirt 22 define a housing 24. Bracket 12 further includes integral stud mounting posts or bosses 26. Bosses 26 are adapted to receive studs 28 which in turn secure bracket 12 to the side of a vehicle. As best seen in FIG. 2, bracket 12 is generally planar in shape and has a low profile in side elevation. The bracket does not include any outwardly extending stalks or arms. Peripheral skirt or wall 22 includes a rearwardly extending, generally planar portion 30. Generally centrally of portion 30, the wall defines a concave portion 32 having a bearing surface 34. Portion 32 is formed with a through aperture 36.

Figure 3:
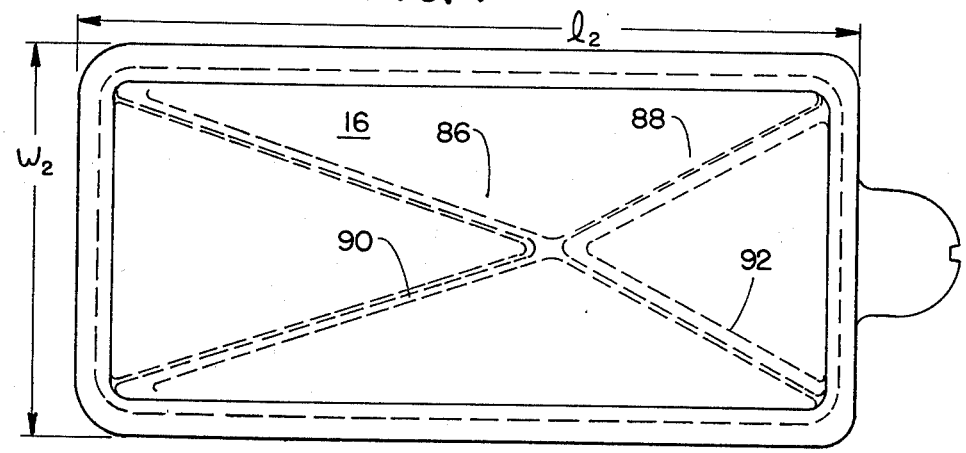
FIG. 3 is a rearward, elevational view of the mirror and mirror case.

As best seen in FIGS. 1, 2 and 3, mirror case 14 is generally rectangular in plan and includes a forward, planar, elongated surface 40 and a peripheral skirt 42. Case 14 in sectional view, as seen in FIG. 2, is generally triangular in shape. The width dimension of case 14 approximates the maximum width dimension of bracket 12 which is the longitudinal length of wall portion 30 of the bracket. Conventional glass mirror 16 is secured to case 14 by a frame 46. In the preferred construction, both the bracket and the mirror case 14 are fabricated from a thin wall die cast zinc material. It is presently preferred that the frame 46 be cemented to the case 14 along the skirt 42.

Skirt 42 includes a transverse, inboard sidewall portion 50. Extending outwardly from sidewall portion 50 and generally centrally thereof is a protuberance or bulbous portion 52. Portion 52 is generally spherical in configuration and defines a spherical, convex bearing surface 54. Bearing surface 54 is configured to mate with concave or socket-like bearing surface 34 defined by bracket 12.

Protuberance 52 is formed with a conical shaped bore 56. Bore 56 opens through surface 54 and terminates adjacent the center of curvature or spherical radius point 58 of the bearing surface. As best seen in FIGS. 4, 5 and 6, portion 52 is also formed with a slot 60 which extends through an arc angle of approximately 90°, through the surface 54 and also which intersects with bore 56. Portion 52 also defines a spring attachment strap or portion 62. Portion 62 defines a passage or bore 64.

As best seen in FIG. 2, the bearing surfaces are held in frictional engagement by a spring means 70. In the preferred embodiment, spring means 70 is a coil spring having a coil or wound portion 72 and ends 74, 76. Ends 74, 76 are each formed with hook portions 78. The hook portions are angularly related at an angle of 90°. Hook portion 78 of end 74 is attached around mounting boss 26 which is in line with aperture 36. The opposite end 76 of spring 70 is hooked through passage 64 defined by attachment portion 62. Bore 56 and slot 60 are dimensioned so that case 14 may rotate relative to bracket 12 for adjustment purposes. The relative dimensioning, as seen in FIG. 8, of these components also permits case 14 to pivot to a position generally parallel to the vehicle and within an "envelope" defined by bracket 12 upon the application of a force to the forward surface 40 of the mirror case. The envelope is the area between the side of the vehicle and a plane generally extending from surface 20 of bracket 12 and which plane is parallel with the vehicle side.

In a presently existing embodiment of the rear view mirror in accordance with the present invention, bracket 12 has an overall height or depth dimension designated $h_1$ in FIG. 2 of approximately 29 mm. The maximum width dimension of the bracket or the longitudinal length of sidewall 30 is approximately 90 mm. This is designated $w_1$ in FIG. 1. The overall longitudinal dimension of bracket 12 is designated $l_1$ in FIG. 1 and is approximately 90 mm. Case 14 has an overall length dimension designated $l_2$ in FIG. 3 of approximately 183 mm. The overall width of case 14 is designated $w_2$ and is approximately 90 mm. The maximum length designated $h_2$ in FIG. 2 of case 14 is approximately 28 mm. Spherical portion 52 has a spherical diameter of approximately 29.0 mm. Bore 56 has a maximum diameter of 14.2 mm. and a 10° conical draft. The centerline designated $c_1$ of bore 56 extends outwardly at an acute angle designated "a" in FIG. 2 relative to a plane desingated 80 in FIG. 2. Plane 80 extends through the spherical center 58 and is parallel with the surface of mirror 16. The angle "a" in the presently existing embodiment is approximately 62°. The centerline $c_1$ therefore extends at an obtuse angle with respect to plane 80 of approximately 118°. Slot 60 includes opposed sidewalls 82, 84. In the presently existing embodiment, sidewalls 82, 84 are spaced apart a distance $l_3$ (FIG. 5) of approximately 3.3 mm. Also, as seen in FIGS. 2 and 3, case 14 is preferably fabricated with a reinforcing rib structure including ribs 86, 88, 90 and 92. The ribs also provide a backing for the mirror surface 16.

The coil spring 70 in the presently existing embodiment is formed from music wire. The spring is formed with an 11.5 mm. maximum outer diameter and end portions 17 have an overall length of approximately 17 mm. The hooks formed by the end portions have an 8 mm. diameter. It is presently preferred that the spring be stretchable through a displacement of approximately 10 mm. and have an overall loaded length of approximately 55 mm. The spring load is approximately 133 newtons. The specific wire size and number of turns is, however, optional. The mirror case 14 and bracket 12 are easily and inexpensively manufactured employing conventional die casting techniques. It is presently preferred that these elements be die cast from a zinc material and then finished with a bright chrome on all exposed surfaces. When die casting the mirror case 14, it is presently preferred that portion 62 initially be formed by a dimple at the bottom of bore 56. This dimple would then be drilled through slot 60 to define the through passage 64.

OPERATION

As seen in FIGS. 7 and 8, bracket 12 is secured to the side of a vehicle by studs 28. Prior to attachment, mirror case 14 is secured to bracket 12 by means of coil spring 70 by looping the hook 78 of end portion 76 through passage 64. End portion 74 is then attached to mounting stud 26. The coil portion of the spring is maintained entirely within the confines of housing 24 defined by bracket 12. The dimensioning and relative configuration of the spherical bearing surface 54 and the concave bearing surface 34 as well as the dimensioning of bore 56 and slots 60 permit the mirror case 14 to be adjusted within certain limits angularly with respect to bracket 12 for viewing purposes. Upon the application of a force to the forward surface 40 of case 14 such as when an object is struck while the vehicle is moving, the entire mirror case may pivot through an angle of approximately 90° to a point where mirror surface 16 is generally parallel with the side of the vehicle at an angle of at least 180° with respect to bracket surface 20. Spring end 76 will pass through slot 60. As seen in FIG. 8, when in the "breakaway" or stored position, the maximum outward extension of the entire assembly is determined by the maximum depth $h_1$ of bracket 12.

Another advantage of the assembly in accordance with the present invention is illustrated in FIG. 9. As shown therein, the mirror may be impacted from the rear and case 14 will pivot forwardly beyond its normal most forward position under the resilience of spring 70. The case pivots on concave bearing surface 34 until sidewall portion 50 stops against wall portion 30 of bracket 12. The case can continue to pivot to a limited extend about wall portion 30 upon stretching of spring 70. Convex bearing surface 54, as shown, will lift out of engagement with concave surface 34. Surfaces 50 and 30 at the outer stop position are beveled to accommodate normal forward rotation of case 14 to a stop position at least perpendicular to the side of the vehicle. This is clearly seen in FIGS. 7 and 9. The assembly, therefore, provides limited "breakaway" capability in the forward direction and is capable of absorbing impact loads from the rear of the case.

Bracket 12 is tapered in section towards its leading edge. A relatively smooth but aesthetically pleasing configuration is presented and bracket 12 generally will not snag or catch on an object contacted. The mirror case and bracket are essentially flush with the side of a vehicle and no protuberances, arms or stalks extend outwardly to cause injury or be damaged by such impact. This represents a significant advantage over the prior structures. Also, the present invention represents a significant reduction in the number of individual pieces employed. Prior ball socket type joints usable in mirror structures have employed a compression spring which by necessity had to be compressed between a washer and the joint structure positioned around some form of post or bolt. Employing spring 70 which is in tension eliminates the need for this additional part. Further, the need for washers, etc., is also eliminated. The single coil spring insures frictional engagement with the bearing surfaces so that the mirror will be retained in its adjusted position yet permit the mirror to function as a breakaway mirror. Additional pivots or joints are not needed to achieve this breakaway feature. The entire structure is essentially a low profile device. The configuration of the mirror is also aesthetically pleasing and readily matches the aesthetics of the vehicle. With typical prior devices, as discussed above, the pivot point or joint is formed on the forward surface of the mirror. This limits the angular adjustment and relative positioning of the mirror relative to the vehicle. With the present invention, however, the joint is defined along the side of the mirror. A large field of view is obtained and ready pivotal movement of the mirror case from a first or operating position to its breakaway position is obtained.

In view of the foregoing description, those of ordinary skill in the pertinent art will undoubtedly envision various modifications which would not depart from the inventive concepts disclosed herein. It is, therefore, expressly intended that the above description should be considered as only that of the preferred embodiment. The true spirit and scope of the present invention may be determined by reference to the appended claims.

The embodiments of the invention in which an exclusive property or privilege is claimed are defined as follows.

1. An adjustable breakaway rear view mirror support assembly for use with a vehicle, said mirror support assembly comprising:
   a low profile mounting bracket adapted to be fixedly secured to the vehicle;
   a mirror carrying member; and
   means securing said mirror carrying member to said mounting bracket for permitting manual adjustment of the mirror carrying member for viewing purposes and for achieving breakaway action by permitting the carrying member to rotate to a position generally parallel to the mounting bracket when a force is exerted on the forward surface of the mirror carrying member, said means including:
   one of said bracket and said member including a portion defining a concave bearing surface and the other of said bracket and said member including a portion defining a convex and at least partially spherical bearing surface engaging said concave surface, said surfaces dimensioned to permit rotation of said carrying member relative to said mounting bracket; and
   tension spring means connected at one end to said mounting bracket and at the other end to said carrying member and being stretched between said bracket and said carrying member for pulling said surfaces into frictional engagement and permitting said carrying member to be adjusted to a plurality of stationary positions for viewing, yet permitting said carrying member to rotate to a position generally parallel to and generally in the same plane and envelope as said mounting bracket.

2. A mirror support assembly as defined by claim 1 wherein the portion defining the spherical bearing surface has a bore opening through the spherical bearing surface and extending to at least the center of curvature of said spherical bearing surface, said portion defining a spring means attachment at the center of curvature.

3. A mirror support assembly as defined by claim 2 wherein the portion defining said concave bearing surface has an aperture opening therethrough.

4. A mirror support assembly as defined by claim 3 wherein said tension spring means is a coil spring having an end portion extending through said aperture and connected to said mounting bracket and another end extending into said bore and connected to said spring means attachment.

5. A mirror support assembly as defined by claim 4 wherein said portion defining said spherical bearing surface further defines a slot opening through the surface along an arc angle of approximately 90° and intersecting said bore to thereby provide clearance for the another end of said spring as said carrying member rotates to a position generally parallel with said mounting bracket.

6. A mirror support assembly as defined by claim 2 wherein said mirror carrying member includes an elongated housing portion having a peripheral sidewall to which a mirror may be secured and which defines a mirror plane.

7. A mirror support assembly as defined by claim 6 wherein the centerline of said bore extends at an obtuse angle with respect to a plane extending through the center of curvature of said spherical bearing surface defining portion and which is parallel to the mirror plane.

8. A mirror support assembly as defined by claim 7 wherein the portion defining said concave bearing surface has an aperture opening therethrough.

9. A mirror support assembly as defined by claim 8 wherein said tension spring means is a coil spring having an end portion extending through said aperture and connected to said mounting bracket and another end extending into said bore and connected to said spring means attachment, said tension spring means, said bracket and said member also permitting said member to resiliently pivot forwardly beyond a normal forward stop position.

10. A mirror support assembly as defined by claim 9 wherein said portion defining said spherical bearing surface further defines a slot opening through the surface along an arc angle of approximately 90° and intersecting said bore to thereby provide clearance for the another end of said spring as said carrying member rotates to a position generally parallel with said mounting bracket.

11. A mirror assembly for attachment to the side of a vehicle, said assembly comprising:

a first member having a generally planar surface and a peripheral sidewall, said peripheral sidewall including a portion defining a concave bearing surface, said portion including an aperture extending through said bearing surface;

a second member having a generally planar surface and a peripheral skirt, said second member including a protuberance extending outwardly and at an angle from said skirt, said protuberance defining a convex at least semi-spherical bearing surface abutting said concave bearing surface;

a mirror fixedly secured to said second member at the skirt so as to move and be adjustably positioned by movement of said second member; and a spring in tension having an end extending through said sidewall aperture and secured to said first member and another end secured to said second member, said first member and said second member dimensioned to permit said second member to rotate and be positioned in any of a plurality of adjustment positions for viewing, yet permitting said second member to rotate to a position wherein said second member planar surface is at an angle of at least 180° with respect to said planar surface of said first member to thereby achieve breakaway operation.

12. A mirror assembly as defined by claim 11 wherein said protuberance defines a conically shaped bore opening through its bearing surface and terminating at the center of curvature of said at least semi-spherical bearing surface.

13. A mirror assembly as defined by claim 12 wherein said protuberance further defines a slot opening therethrough and intersecting said bore, said another end of said spring being secured at the center of curvature of said protuberance bearing surface, said bore and said slot of said protuberance dimensioned to permit said protuberance to rotate about said concave surface and past said spring.

14. A mirror assembly as defined by claim 13 wherein the centerline of said bore extends at an acute angle relative to a plane extending through the center of curvature and which is parallel to the front surface of said mirror.

15. An improved rear view mirror device adapted for attachment to the side of a vehicle and capable of rotating upon application of force thereto in a breakaway fashion, said mirror including a bracket adapted to be secured directly to the vehicle and a mirror case wherein said improvement comprises said mirror case having a peripheral skirt and a protuberance extending from said peripheral skirt and defining a spherical bearing surface, said bracket having a low profile peripheral wall defining a concave, socket-like bearing surface engaged by said spherical bearing surface, and a coil spring stretched in tension and having an end secured to said bracket and another end secured to said mirror case, said mirror case and said bracket dimensioned to permit said mirror case to be adjusted to any of a plurality of viewing positions and to rotate to a position generally parallel to the side of the vehicle and within the envelope defined by said bracket upon the application of force thereto in a rearward direction to prevent damage to said mirror case; said mirror case, said bracket and said coil spring also being dimensioned to permit forward breakaway movement of the mirror case upon the application of a force thereto in a forward direction.

16. An improved rear view mirror device as defined by claim 15 wherein said protuberance defines a bore opening therethrough and an attachment strap at the center of curvature of the spherical bearing surface to which said another end of said spring is attached.

17. An improved rear view mirror device as defined by claim 16 wherein said bracket socket-like bearing surface has an aperture opening therethrough and through which said another end of said spring extends, the coils of said coil spring being positioned within a housing defined by said bracket.

18. An improved rear view mirror device as defined by claim 17 wherein said protuberance defines a slot extending through an arc angle of approximately 90° and intersecting the bore of said protuberance, said slot dimensioned to pass by said spring as said mirror case rotates to a position generally parallel with the vehicle side.

19. An improved rear view mirror device as defined by claim 18 wherein said bore is generally conical in cross section to permit normal adjustment of said mirror case without interference with said spring.

20. An improved rear view mirror device as defined by claim 19 wherein said protuberance bore has a centerline extending at an acute angle with respect to a plane passing through the center of curvature and parallel with a mirror carried by said mirror case.

* * * * *